US011710086B2

(12) United States Patent
Ghazi et al.

(10) Patent No.: US 11,710,086 B2
(45) Date of Patent: *Jul. 25, 2023

(54) SYSTEM AND METHOD FOR MANAGING PRODUCT USAGE FROM DISPENSERS (71) Applicant: Kimberly-Clark Worldwide, Inc., Neenah, WI (US)

(72) Inventors: Babak R. Ghazi, Atlanta, GA (US); Frederick J. Williams, Jr., Cumming, GA (US); Stephen Becker, Cumming, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/898,612

(22) Filed: Aug. 30, 2022

(65) Prior Publication Data

US 2023/0004881 A1    Jan. 5, 2023

Related U.S. Application Data (63) Continuation of application No. 16/999,206, filed on Aug. 21, 2020, now Pat. No. 11,443,253, which is a continuation-in-part of application No. 16/309,984, filed as application No. PCT/US2016/039777 on Jun. 28, 2016, now Pat. No. 10,762,451.

(51) Int. Cl.
*A47K 10/36* (2006.01)
*G06Q 10/06* (2023.01)
(Continued)

(52) U.S. Cl.
CPC ............. *G06Q 10/06* (2013.01); *A47K 10/34* (2013.01); *A47K 10/3625* (2013.01);
(Continued)

(58) Field of Classification Search
CPC ........ A47K 2010/3625; A47K 10/3625; A47K 5/1217; G08B 21/245
See application file for complete search history.

(56) References Cited

U.S. PATENT DOCUMENTS

| | | | |
|---|---|---|---|
| 10,762,451 B2 * | 9/2020 | Ghazi | G06Q 50/10 |
| 11,443,253 B2 * | 9/2022 | Ghazi | G06Q 10/20 |

(Continued)

FOREIGN PATENT DOCUMENTS

| | | |
|---|---|---|
| CN | 101223693 A | 7/2008 |
| CN | 101911108 A | 12/2010 |
| JP | 2007-188333 A | 7/2007 |

OTHER PUBLICATIONS

International Preliminary Report on Patentability Corresponding to Application No. PCT/US16/3 9777 dated Aug. 14, 2017.

(Continued)

*Primary Examiner* — Timothy R Waggoner
(74) *Attorney, Agent, or Firm* — Dority & Manning, P.A.

(57) ABSTRACT

A system and method are provided for improving product usage prior to refill of product dispensers in service areas that include a plurality of such dispensers. Via a sensor configured with each of the product dispensers and a control system in communication with the sensors, a product level or amount condition of product in each dispenser is detected. Based on the information from the sensors, a visual or audio message is generated and transmitted to the patron that encourages the patron to use a first product dispenser that has a greater product fill amount as compared to a second product dispenser in the same or a different service area.

11 Claims, 3 Drawing Sheets

(51) Int. Cl.
  *G06Q 50/10* (2012.01)
  *G06Q 10/20* (2023.01)
  *G08B 21/24* (2006.01)
  *A47K 10/34* (2006.01)
  *A47K 10/32* (2006.01)

(52) U.S. Cl.
  CPC .............. *G06Q 10/20* (2013.01); *G06Q 50/10* (2013.01); *G08B 21/245* (2013.01); *A47K 2010/3226* (2013.01)

(56) References Cited

U.S. PATENT DOCUMENTS

| | | |
|---|---|---|
| 2005/0171634 A1 | 8/2005 | York et al. |
| 2008/0169301 A1 | 7/2008 | Mok et al. |
| 2011/0133019 A1 | 6/2011 | Keily et al. |
| 2013/0213995 A1* | 8/2013 | Horel .................. A47K 10/424 221/197 |
| 2013/0240554 A1 | 9/2013 | Strahlin et al. |
| 2014/0142966 A1 | 5/2014 | Badgett et al. |
| 2015/0022361 A1 | 1/2015 | Gaisser et al. |
| 2015/0228181 A1 | 8/2015 | Himmelmann et al. |
| 2015/0238056 A1 | 8/2015 | Fellhoelter |
| 2016/0262580 A1 | 9/2016 | Fellhoelter |

OTHER PUBLICATIONS

GB Office Action Corresponding to Application No. 1900507 dated Nov. 24, 2020.
PCT Search Report, dated Mar. 24, 2017.
Chinese Office Action Corresponding to Application No. 201680086694.2 dated Dec. 2, 2022.

* cited by examiner

SYSTEM AND METHOD FOR MANAGING PRODUCT USAGE FROM DISPENSERS

CROSS REFERENCE TO RELATED APPLICATIONS

The present application is a continuation of U.S. application Ser. No. 16/999,206, filed Aug. 21, 2020, now U.S. Pat. No. 11,443,253, which is a continuation of U.S. application Ser. No. 16/309,984, filed Dec. 14, 2018, now U.S. Pat. No. 10,762,451, which claims priority to PCT/US2016/039777, filed Jul. 28, 2016.

FIELD OF THE INVENTION

The present invention relates generally to a system and method to reduce product wastage from service area dispensers by encouraging patrons to use certain dispensers over others.

BACKGROUND

With respect to typical workplace service areas, such as those facilities in a manufacturing plant, health care facility, office building, and the like, maintenance of the service areas is generally assigned to a maintenance team member ("attendant") that visits the service area on a scheduled or periodic basis to refill dispensers and ensure the cleanliness of the facility. The same attendant or attendants may be assigned responsibility for a multitude of service areas within the building or site.

In general, the attendant has little to no knowledge of the condition of the facility, especially the fullness state of the various product dispensers, until actually entering the facility. In this regard, the attendant must be prepared for completely empty dispensers in the service areas they are responsible for. The refill supplies are generally not stocked in the service areas, and the attendant must carry sufficient refill supplies for a "worst case scenario", which can be an overly burdensome task depending on the number of service areas and types of dispensers. In view of this, it has been found that significant product wastage can be attributed to certain refill practices by the attendants.

For example, a towel dispenser may be one-third full when checked by an attendant. It is a common practice, however, to attempt to overstuff the dispenser with a full refill during a scheduled maintenance visit. This overstuffed condition often results in jamming of the dispenser or overuse of towels by the service area patrons, for example when multiple towels are dispensed as a result of the overstuffed condition. If the dispenser has an overstuff-prevention device, it is also a practice to discard the remaining towels in the dispenser to that a new, full, refill can be loaded into the dispenser. Over time, such wastage can be quite expensive for the building proprietor.

When the attendant has been assigned responsibility for a number of service areas within a facility or site, it is the typical practice for the attendant to establish a route between the service areas for filling the dispensers regardless of the actual depletion state of the consumable product or whether it would be more efficient for a different attendant to replace the product at the same or a different time. This practice can also lead to significant wastage over time.

The industry would benefit from a system and method wherein product wastage is reduced by a more efficient use of the dispenser products by patrons prior to refill by the service area attendant.

SUMMARY OF THE INVENTION

Objects and advantages of the invention will be set forth in part in the following description, or may be obvious from the description, or may be learned through practice of the invention.

A method and associated service area system are presented incorporating aspects of the invention. The term "service area" is used generically herein to encompass any manner of public, semi-public, or private facility visited by patrons or employees to use sink or toilet facilities, bathing facilities, changing facilities, sanitation facilities, and so forth. The term "service area" includes any location or type of facility where product dispensers are installed, such as break rooms, food processing sanitization stations, industrial manufacturing floors, and so forth. Particular non-limiting examples of such service areas referred to in this description for explanation purposes are washroom facilities (also known as restrooms), toilet closets, public bathrooms, men's room, ladies' room, and the like. A typical public or semi-private service area has a number of toilet facilities or urinals and sinks.

Although the present method and service area system are particularly useful in an "away-from-home" public or semi-private environment, the system is not limited by scope of use. As used herein, the term "away-from-home" means a place or location where people congregate for various reasons or purposes that are outside the typical home. Examples of away-from-home locations include places of business, such as office buildings, office suites, retail stores, and warehouses, manufacturing facilities; schools; hospitals and other types of medical facilities; places of worship; hotels and motels; conference centers; and the like. The method and system are particularly well-suited for structures or facilities wherein multiple service areas are provided for use of the building tenants, or an industrial or manufacturing site wherein multiple site facilities are provided for a controlled populace. All such locations, structures, and sites are referred to generically herein as a "facility." It should be appreciated though that the present service area system and method may prove useful in a residential or private environment, and such uses are within the scope and spirit of the invention.

In accordance with aspects of the invention, a system and related method are provided for managing dispenser operation to cause one product dispenser to be used over another in order to optimize product usage prior to refilling the dispensers. Each of the service areas has one or more consumable product dispensers that require periodic refill, such as towel dispensers, soap dispensers, toilet tissue dispensers, and so forth. Within each service area, the product dispensers are configured with a sensor that detects a level or amount state of the product remaining in the dispenser. The sensors are in communication with a control station assigned to the service area, wherein the control station determines usage data related to the various dispensers (among other tasks). The control station may include any manner of computer hardware/software system configuration for this purpose, and may be in communication with the sensors via a wired or wireless communication network.

A plurality of the service areas may be assigned to a common control station. For example, all of the service areas within a building or site location may communicate with the same control station via a suitable wired or wireless communication network. The control station may include or be interfaced with any manner of server system for carrying out the functions described herein. The server system may be a remote system that functions with a plurality of the control stations, or may be a dedicated system for each service area.

In accordance with aspects of the present method, via a sensor configured with each of the product dispensers and the control system in communication with the sensors, the level or amount condition of product in each of the dispensers is determined. Based on this information, the method includes generating and transmitting a visual or audio message to the patron that encourages the patron to use a product dispenser that has a greater fill amount as compared to another product dispenser in the service area that dispenses the same product. In this manner, the patrons are influenced to use the dispensers having the most product at the particular time they are in the service area, with the intent being to deplete the dispensers as much as possible with the method before the attendant refills the dispensers.

The product dispensers may be any one or combination of towel dispenser, soap dispenser, or toilet tissue dispenser. For example, the service area may be a washroom that includes multiple stalls with a respective toilet tissue dispenser. The method can use any manner of audio or visual message to cause use of the stall having the fullest toilet tissue dispenser. Similarly, the method can cause use of a particular sink having the fuller soap dispenser as compared to another sink, or to use a towel dispenser having more towel material as compared to another towel dispenser in the service area.

In certain embodiments, the first and second product dispensers are in the same service area within the facility and are of the same type (e.g., both may be hand towel dispensers), and the message is transmitted to the patron via a device inside of the service area, for example via one or more audio/video (A/V) device in the service area, such as video boards or displays, speakers, and so forth. The service area may be equipped with a sensor to detect the presence of the patron within the service area prior to transmitting the message. For example, in one embodiment, sensors may be located within the service area to detect the presence of the patron adjacent to the first and second product dispensers (e.g., adjacent to the sinks where the soap dispensers and towel dispensers are located), wherein the message encourages the patron to use one of the product dispensers over the other.

In other embodiments, the message is transmitted to the patron via an audio/video devise located outside of the service area, for example via a video screen or display adjacent the door of the service area. The message may encourage the patron to use certain facilities within the service area prior to the patron entering the service area. In an alternative embodiment, the message may encourage the patron to visit a different service area, for example when the towel dispensers in one service area are nearly depleted, but the towel dispensers in a different service area are nearly full. Thus, in this embodiment, the first and second product dispensers are actually in different service areas.

In a particularly unique embodiment, the message intended to influence the patron's selection of dispenser is a visual configuration of the dispenser that can be altered or modified based on a fullness state of the dispenser. For example, in a certain embodiment, the first and second product dispensers are electronic towel dispensers within the same service area, wherein the dispensers are configured to switch operation between (1) a hanging-towel mode wherein a portion of a towel (a "tail") hangs from the towel dispenser and is visible to the patron, and a subsequent towel portion is automatically dispensed and hangs from the towel dispenser upon removal of the hanging towel by the patron, and (2) a hidden towel mode wherein a towel to be dispensed is contained completely within the towel dispenser and is not dispensed until the patron is detected adjacent to the dispenser. Both of these modes of operation are well-known in the industry. The method includes monitoring the fill level of towel material in both of the first and second towel dispensers while operating both dispensers in the hidden towel mode. Upon one of the first or second towel dispensers reaching a setpoint low fill level, the other respective towel dispenser is remotely switched to operate in the hanging towel mode. Thus, the patron is presented with one towel dispenser having a visible towel tail, and another dispenser with no visible towel material. The visual tail of the towel dispenser operating in the hanging towel mode is intended to influence the patron to retrieve a towel from that particular dispenser, as compared to the other towel dispenser operating in hidden towel mode.

The method may further include switching the towel dispenser operating in hanging towel mode back to hidden towel mode upon reaching the setpoint low fill level in the towel dispenser operating in hanging towel mode. Alternatively, the method may include switching the towel dispenser operating in hidden towel mode to hanging towel mode upon reaching the setpoint low fill level in the towel dispenser operating in hanging towel mode.

DETAILED DESCRIPTION OF THE INVENTION

Reference will now be made in detail to one or more embodiments of the invention, examples of the invention, examples of which are illustrated in the drawings. Each example and embodiment is provided by way of explanation of the invention, and is not meant as a limitation of the invention. For example, features illustrated or described as part of one embodiment may be used with another embodiment to yield still a further embodiment. It is intended that the invention include these and other modifications and variations as coming within the scope and spirit of the invention.

As mentioned, in one aspect, the present invention relates to a method and system for encouraging or influencing patrons of a service area to select one product dispenser over another in order to more efficiently use the amount of product in the service area prior to an attendant refilling the various dispensers.

For purposes of ease of explanation only, the service area in the illustrated embodiments is depicted as a washroom. It should be readily appreciated that the present methods and systems are not limited to washrooms, as described above.

Figure 1:
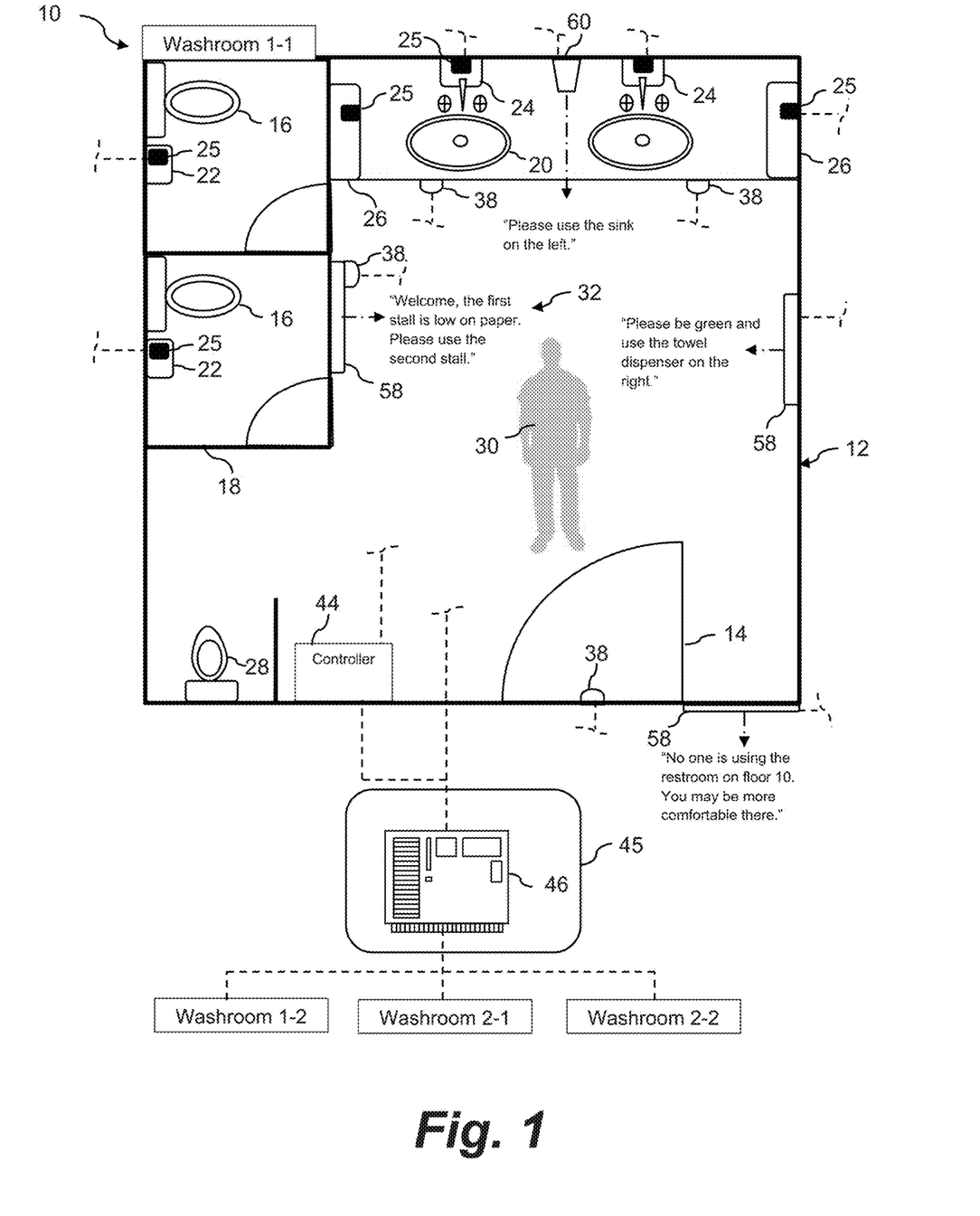
FIG. 1 is a diagram view of a service area facility incorporating a system and method in accordance with aspects of the present invention.

Referring to FIG. 1, an embodiment of a system and related method 10 are illustrated with respect to a public or semi-private service area 12 within a building or business site location. The building may have a plurality of similarly configured service areas 12 on one or multiple floors. For example, FIG. 1 depicts two service areas (service area 1-1 and 1-2) on a first floor of the facility and two service areas (2-1 and 2-2) on a second floor of the facility.

The design and features of the service area 12 depicted in FIG. 1 are for illustrative purposes only. The service area 12 is depicted as a men's restroom facility having one or more individual stalls 18 (with individual toilets 16) and one or more urinals 28. A number of sinks 20 are also provided. Any combination of consumable product dispensers are also be provided in the service area facility 12, such as toilet tissue dispensers 22, soap dispenser 24, towel dispenser 26, and so forth. The individual stalls 18, urinals 28, and sinks 20, may be considered as "functional locations" wherein patrons may perform a desired function within the service area 12. It should be appreciated that any manner of additional functional locations may also be included in the facility 12, such as shower stalls, dressing rooms, infant changing stations, and so forth.

FIG. 1 depicts a patron 30 that has entered the service area 12 through the door 14. This patron will, in all likelihood, use one of the function locations and the product dispenser 22, 24, 26 associated therewith.

Within each service area 12, the product dispensers 22, 24, 26 are configured with a sensor 25 that detects a level or amount condition of the product in the dispenser based on any number of direct or indirect operational principles. For example, an indirect measurement of product usage may be based on an accumulated amount of run time that correlates to product usage. Direct measurement of product usage may rely on a sensor configured with the dispenser. Various types of product dispensers configured with sensors are well known in to those skilled in the art and a detailed explanation thereof is not necessary for purposes of the present disclosure. Examples of such dispensers include mechanical arm sensors (e.g., a mechanical arm/potentiometer that rests on a product roll and detects a change in roll diameter as the product is depleted), non-contact electrical sensors (e.g., IR sensors, capacitive sensors), optical sensors (camera-based sensor), weight sensors, and so forth.

The sensors 25 associated with the various product dispensers 22, 24, 26 are in communication with a control station 45 via any manner of suitable wireless communication system (as indicated by the dashed lines in FIG. 1) or wired network. The information signal from the sensors includes an identification tag (or other identification means) that identifies the particular dispenser 22, 24, 26 to the control station. The control station 45 is a computer-implemented system (a computer along with any software and peripheral devices that are necessary to make the computer function as described herein) that may be remotely located from the service area 12 or configured within the service area 12. For example, the service area 12 may include an individual controller 44 that receives the signals from the various sensors 25 and detectors 38 (explained in more detail below) and coordinates transfer of such signals to the control station 45. Alternately, the sensors 25 and detectors 38 may communicate directly with a remote control station 45, as also depicted in FIG. 1.

The control station 45 may monitor a number of similarly-configured service areas 12 within the facility, as indicated by the service areas 1-2, 2-1, and 2-2 in FIG. 1. Each service area 12 may include an individual controller 44 (which may be a hardware device or a software program that manages or directs the flow of data between two entities). The control station 45 may include or be in direct communication with a server system 46 (described in greater detail below). Information from the control system 45 may be used by the server system 46 to compute dispenser fill levels, message trigger times, generate and transmit the patron messages 32, and so forth, that are unique to each of the service areas 12 based upon the detected product level the dispensers 22, 24, 26 and one or more patrons 30 in the respective service area 12.

In the embodiment depicted in FIG. 1, a number of message broadcast devices are illustrated within the service area 12, including an audio device 60 (e.g. speaker) located adjacent the sinks 20, and audio/video (AN) devices 58 located on a walls within the service area 12, and so forth. All of these devices 58, 60 are in communication with the control station 45 via a suitable wireless or wired communications network, as depicted by the dashed lines in FIG. 1.

In FIG. 1, three different messages 32 are broadcast to the patron 30 for illustrative purposes. The left hand soap dispenser 24 has been determined by the control station 45 to have more soap than the right hand soap dispenser. A message 32 is generated by the control station 45 (which includes retrieval of a stored message 32) and sent to the speaker 60 located between the soap dispensers 24. The message is broadcast in the service area 12 and the requests the patron 30 to use the sink on the left, and thereby the left hand soap dispenser 24. In one embodiment, the message 32 is not generated or transmitted until one of the soap dispensers is depleted to a predefined low level setpoint, for example 10% remaining soap. In another embodiment, the message generation and transmission process may proceed so long as one dispenser is fuller than the other by a predetermined amount.

In certain embodiments, the messages 32 may be broadcast in the service area 12 on a continuous or periodic basis regardless of whether or not patrons 30 are within the service area 12. For example, the messages 32 may be broadcast during normal working hours at a facility, during expected high traffic times, and so forth.

In an alternate embodiment depicted in FIG. 1, various detectors 38 are located throughout the service area 12 to detect the presence or location of the patron 30, with the detectors 38 in communication with the control station 45 directly or via controller 44. The detectors 38 may have a dedicated controller 44, or may share controller functions with the product level sensors 25. Any manner of conventionally available active or passive detection devices may be used for this purpose. It may be desired to locate a detector 38 at the entrance to the service area (e.g., near the door 14 as depicted in FIG. 1) so that a selected message 32 related to one or more of the dispensers 22, 24, 26 can be broadcast as soon as the patron enters the service area. For example, as depicted in FIG. 1, one such message 32 may be broadcast via one of the AN devices 58 encouraging the patron 30 to use one stall 18 as compared to the other. Thus, this message 32 steers the patron 30 to the stall 18 having the fuller toilet tissue dispenser 22.

Other detectors 38 may strategically located within the service area 12. For example, detectors 38 are located near the sinks 20 to detect when the patron 30 approaches the sinks. Once the patron is detected at the sinks 20, a message 32 can be generated that encourages the patron 30 to use a particular one of the sinks. Likewise, a detector 38 is located near the stalls 18. Once the patron 30 is detected approaching the stalls, a message 32 may be transmitted urging the patron 30 to use the stall having the fuller toilet tissue dispenser 22.

Still referring to FIG. 1, the present system and method include embodiments wherein the message 32 encourages the patron 30 to visit a different service area 12, for example when the towel dispensers 26 in one service area are nearly depleted, but the towel dispensers 26 in a different service area 12 within the facility are nearly full. Thus, in this embodiment, the first and second product dispensers 22, 24, 26 are actually in different service areas 12. FIG. 1 depicts an A/V device 58 located outside of the service area 12 for this purpose. Either continuously or upon detection of a patron 30 about to enter the service area 12, a message 32 is broadcast that encourages the patron 30 to visit another restroom.

It should be appreciated that the messages 32 need not give the status of the various dispensers within a service area 12. The influence or encouragement within the message 32 to visit another service area 12 or use a different dispenser 22, 24, 26 may be for any purpose. For example, the message 32 broadcast outside of the door 14 in FIG. 1 simply tells the patron 30 that there are no patrons in the alternate service area, which may be more comfortable or private.

The messages 32 may be broadcast once or multiple times based on a time function. For example, the messages 32 may be repeated for a set period of time in which it is expected that the patron 30 will remain in the service area 12. A detector 38 may also be used to detect when the patron 30 exits the service area 12, which then causes the control station 45 to terminate play of the messages 32.

The central control system 45 and server system 46 may include stored files 54 (FIG. 2) associated with each of the service areas 12 within the monitored facility, the file containing information on each of the dispensers 22, 24, 26 within the service area 12, such as the type of dispenser, refill product, usage history, and any other pertinent information that may be used to generate and transmit the messages 32 as well as perform various maintenance routines in the service area 12. As mentioned, the signals generated by the various product level sensors 25 may include a unique identifier that associates the dispenser 22, 24, 26 with a particular service area 12 and differentiates between the dispensers 22, 24, 26 from each other. In the case where the signals are routed through a controller 44 that is assigned to the service area 12, the controller 44 may tag the signals with an identifier unique to the service area 12 and the particular dispenser 22, 24, 26. Upon detection of a defined low product level setpoint in one or more of the dispensers 22, 24, 26, the control system 45 can retrieve the file 54 for the respective service area 12 and pull pertinent information related to the alerting dispenser in order to generate the message 32. The files 54 may include any number of prerecorded messages 32 that can be retrieved by the control system 54, wherein "generation" of a message 32 encompasses retrieval of a stored message or composition of a unique message.

As mentioned, certain embodiments will have multiple service areas 2 within a single facility. In this regard, a communications network is configured for these functions, wherein the individual dispensers 22, 24, 26 are considered as network-enabled devices that may be directly connected to the network through a plurality of direct network links, thereby eliminating the need for the bus, router, or other networking equipment. It should also be appreciated that each of the network enabled devices (or a group of such devices) in this configuration may represent a node that, in turn, may be directly connected, multiplexed, or mesh-networked to the network via the direct network links.

Further, the direct network links may represent secure communications channels physically hardened against tampering and/or the communications may be encrypted to prevent unauthorized access to information transmitted thereon.

The server system 46 (which may be integrated with a monitoring system 45) may include a host computer, which may be an integrated server, or include any manner of periphery server or other hardware structure. The central processor system 46 may be a single networked computer, or a series of interconnected computers having access to the network via a gateway or other known networking system. Generally, the central server system 46 may include a central controller configured to manage, execute and control the individual terminal dispenser units, and to interface with the network enabled broadcast devices for retrieval/generation and play of the messages described herein. The central server may include a memory for storing program procedures and routines, a microprocessor (MP) for executing the stored programs, a random access memory (RAM) and an input/output (I/O) bus. These devices may be multiplexed together via a common bus, or may each be directly connected via dedicated communications lines, depending on the needs of the system 10.

The central server 46 may be directly or indirectly connected through the I/O bus to any manner of peripheral devices such as storage devices, wireless adaptors, printers, and the like. In addition, a database (DB) may be communicatively connected to the central server and provide a data repository for the storage and correlation of information gathered from the individual dispenser units, receivers, display devices, or nodes of such devices.

It should be appreciated that the network-enabled devices (e.g., the individual dispenser units) may include similar features or may be configured with functionality to allow for an exchange of information required to function as described herein. The network-enabled devices may include a number of internal components, such as a controller having a program memory, a microcontroller or microprocessor (MP), a random access memory (RAM), and an input/output (I/O) bus, all of which may be interconnected via an address or data bus. The server system may include multiple, and even redundant, program memories and random access memories to increase expandability, capacity and/or processing speed.

The program memory and random access memory may be implemented as a solid-state memory, an integrated circuit, a magnetically readable memory, and/or optically readable memories. Further, the program memory may be read only memory (ROM) or may be read/write memory such as a hard disk. In the event that a hard disk is used as the program memory, the data bus may comprise multiple address/data buses, which may be of differing types, and there may be a separate I/O circuit between the data buses.

Network-enabled devices may be distributed throughout a single business establishment and connected with a LAN, or throughout multiple sites and connected with a WAN. Further, the LAN and/or WAN connecting each of the devices may include one or more separate and secure buses, routers, web servers, gateways and other networking equipment to provide continuous and/or redundant connectivity to the network.

Figure 2:
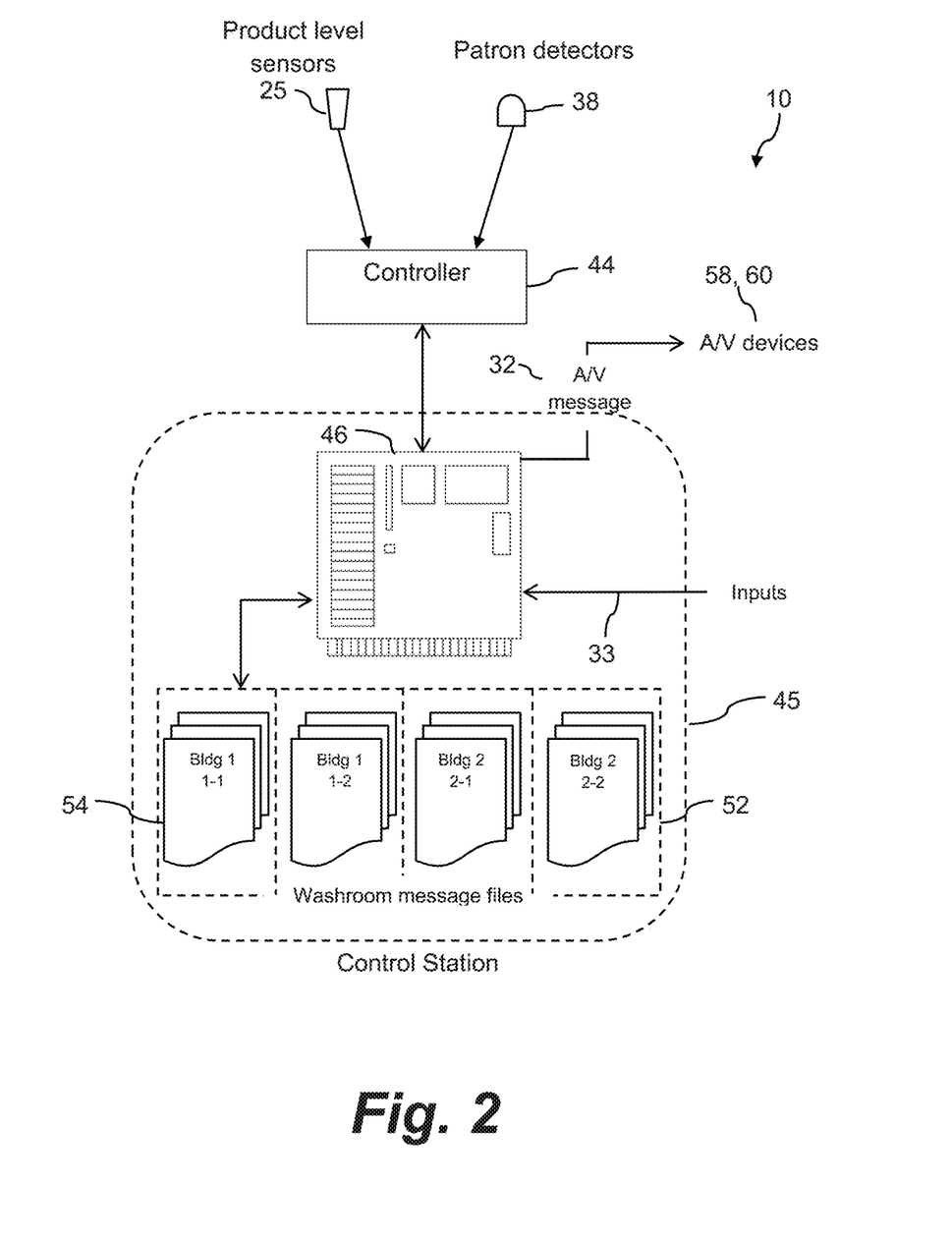
FIG. 2 is a component diagram view of certain control features of a system and method in accordance with the invention.

FIG. 2 is a schematic illustration of certain control aspects of a system 10 in accordance with the invention. In this particular system 10, the central control system 45 includes any manner of computer-implemented server 46 with a library of service area specific files 54 (discussed above), which may include a library 52 or pre-recorded messages 32.

The product level sensors 25 associated with respective product dispensers may be in direct communication with a controller 44 assigned to the service area 12, with the controller 44 in communication with the control system 45. Likewise, the detectors 38 may be in communication with the same or a different controller 44.

Any number of inputs 33 may be provided to the server 46 that enable different types of messages 32 to be generated and transmitted to the patrons. For example, an input 33 may relate to service area information, such as special events, historical product usage, cleaning/refill schedules, complaints/comments regarding particular service areas, types of dispensers in the service area, and so forth.

As mentioned above, the message 32 intended to influence the patron's selection of dispenser may be a visual configuration of the dispenser 22, 24, 26 that can be altered or modified based on a fullness state of the dispenser. For example, the first and second product dispensers may be electronic towel dispensers 26 within the same service area 12, as depicted in FIG. 1. Each of the towel dispensers 26 are configured to switch operation between (1) a hanging-towel ("tail") mode wherein a portion of a towel hangs from the towel dispenser 26 and is visible to the patron 30, and a subsequent tail is automatically dispensed and hangs from the towel dispenser 26 upon removal of the hanging towel by the patron, and (2) a hidden towel mode wherein a towel to be dispensed is contained completely within the towel dispenser 26 and is not dispensed until the patron 30 is detected adjacent to the dispenser. Both of these modes of operation are well-known in the industry. The method includes monitoring the fill level of towel material in both of the first and second towel dispensers 26 while operating both dispensers 26 in the same mode. Upon one of the towel dispensers 26 reaching a setpoint low fill level (e.g., 15% percent towel material remaining), operation of the dispensers is changed as necessary so that the dispenser 26 at the low level setpoint operates in the hidden-towel mode and the dispenser 26 with more towel material is operated in the hanging towel mode. Thus, the patron is presented with one towel dispenser 26 having a visible towel tail, and another dispenser 26 with no visible towel material. The visible tail is intended to influence the patron 30 to retrieve a towel from that particular dispenser 26 having more towel material, as compared to the other towel dispenser operating in hidden towel mode.

The method may further include switching the towel dispenser 26 operating in hanging towel mode back to hidden towel mode when such dispenser 26 also reaches the setpoint low fill level such that both dispensers are in the same mode (hidden towel mode). Alternatively, the dispenser operating in hidden towel mode may be switched to hanging towel mode such that both dispensers are in the same mode (hanging towel mode).

Figure 3:
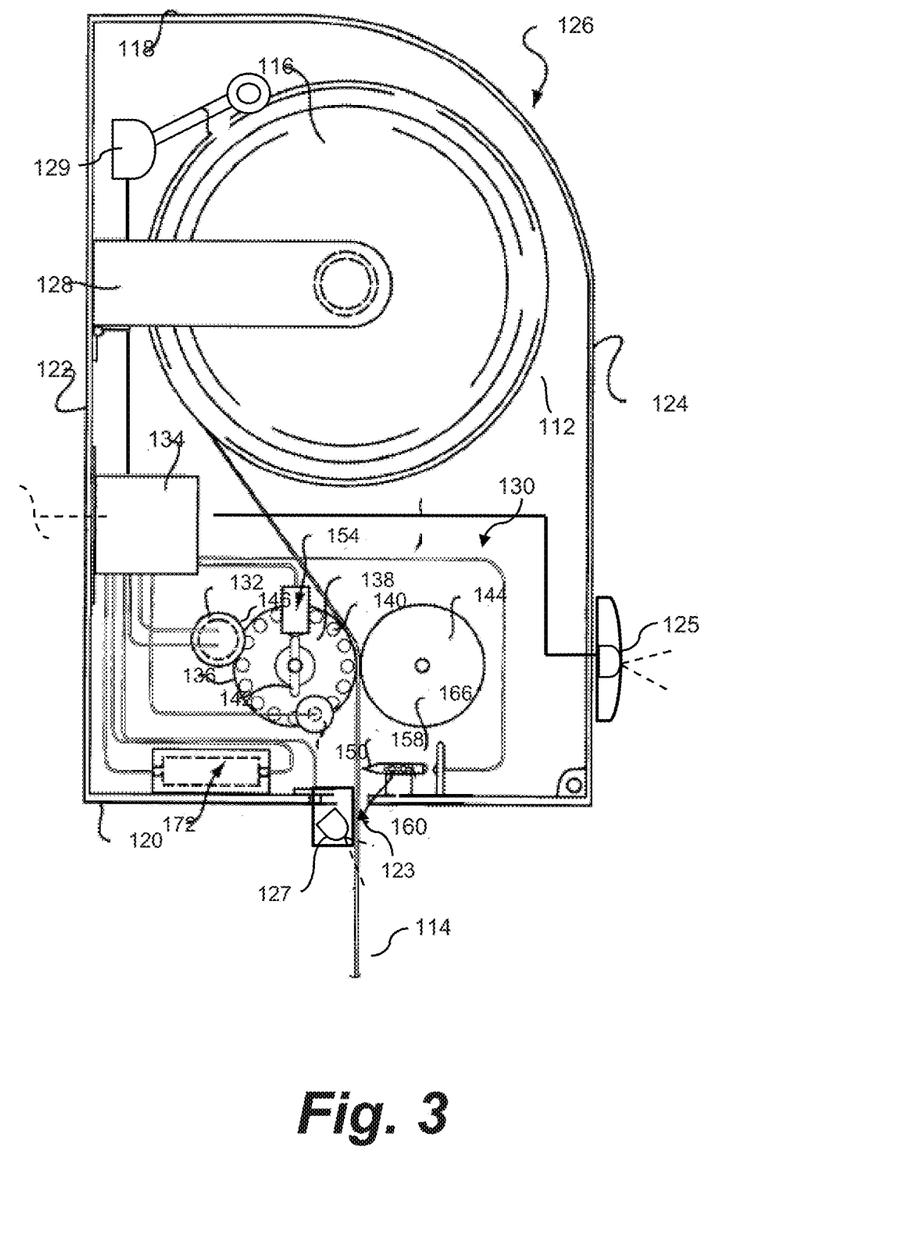
FIG. 3 is a side diagram view of an embodiment of a towel dispenser operable in a hanging towel mode and a hidden towel mode that may be used to practice aspects of the present method.

FIG. 3 depicts a schematic representation of a towel dispenser 126 that may be utilized in the method discussed above. The dispenser 126 in FIG. 3 is presented as an example only. It is to be appreciated that a vast number of towel dispenser are known in the art that can be readily modified (or are already configured) to operate as described herein. For example, U.S. Pat. No. 8,382,026 describes an electronic towel dispenser that operates in various operational modes and could be readily modified by one skilled in the art to function in the present method and system.

Referring to FIG. 3, the dispenser 126 is configured to dispense a primary roll 112 of towel material 116 that may comprise, for example, a standard eight-inch towel roll. The dispenser 126 includes a housing 118 of any general shape and configuration having a bottom portion 120, a front portion 124, and a back portion 122. The dispenser 126 may be mounted to a vertical supporting wall structure by any conventional means. A dispensing slot 123 is defined at an appropriate location in the housing 118, for example in the middle of the bottom portion 120. It should be understood that the dispensing slot 123 may be disposed at various locations in the housing depending on the conveying path of the towel material 116 and configuration of the internal components of the dispenser 126. The dispensing slot 123 is disposed so that a patron can see a tail 114 of the towel material extending therefrom and has easy access to grasp and pull the tail 114.

The roll 112 is rotatably disposed in the housing 118 by any manner of suitable carrier, such as the side arms 128 disclosed in FIG. 3. Various configurations of carrier mechanisms are known in the art for rotatably supporting a roll 112 of material in a dispenser.

The dispenser 126 incorporates an electromechanical feed mechanism, generally 130. The towel material 116 passes through the feed mechanism 130 in its running path through the dispenser housing 118. The feed mechanism 130 operates in the first mechanical mode of operation wherein measured sheets of the towel material 116 are dispensed by the patron simply grasping and pulling on the tail 114 extending from the dispensing slot 123. After the hanging sheet of material 116 has been severed, the feed mechanism 30 is triggered to automatically drive the feed mechanism 130 with an electrically powered motor 32 to dispense a subsequent measured length of the towel material tail 114 out of the dispensing slot 123. A control circuit 134 is configured with the motor 132 and feed mechanism 130 to automatically trigger the feed mechanism 130 at the correct time in the dispensing sequence described above. The controller 134 is in wired or wireless communication with the control system 45, as discussed above and depicted by the dashed line in FIG. 3.

Various sensors are known in the art for detecting the usage of the towel material 116, for example by monitoring the size of the roll 112 as the roll 112 is depleted. U.S. Pat. No. 6,360,181, for example, describes a mechanical sensor that could readily be used for this purpose in the dispenser 126 of FIG. 3 and configured in communication with the controller 134 for transmitting a signal indicative of the amount of material 116 remaining on the roll 112. FIG. 3 depicts a mechanical contact sensor 129 that tracks with the decreasing size of the roll 112, with the sensor 129 connected to the controller 134.

The feed mechanism 130 includes a feed roller 136 rotatably mounted in the housing 118 by any conventional mounting mechanism. The feed roller 136 is drivingly engaged by the motor 132 via a friction roller 146 that engages the surface of the feed roller 136 such that rotation of the friction roll 46 causes corresponding rotation of the feed roller 136. It should be appreciated that any mechanical coupling between the drive motor 132 and the feed roller 136 may be used.

A pressure roller 144 is disposed in opposition to the feed roller 136 and defines a nip with the feed roller 36 through which the towel material 16 passes.

The feed roller 136 is "freely" rotatable to the extent that it does not impede a user from manually pulling a measured sheet of the towel material 116 from the dispenser. For example, the feed roller 36 remains in contact with the friction roll 146 while a user pulls the towel material 116 between the feed roller 136 and pressure roller 144. The friction roll 146 and the shaft of the motor 132 will thus also rotate but do not exert enough resistance to prevent the feed roller 136 from freely rotating as the user pulls the tail 114. In an embodiment wherein a clutch is disposed between the motor 132 and feed roller 136, the clutch would be disengaged after the tail 114 has been feed out of the slot 123 and, thus, the feed roller 136 would actually free-wheel when the user pulls on the tail 114. In an embodiment wherein the motor 132 is directly geared to the feed roller 136, the gearing and motor 132 would offer some resistance, but would not impede the ability of the user to pull the tail 114 of material in order to dispense a measured sheet of the material 116.

After the user has pulled a measured length of the towel material 116 from the dispenser 126, the material 116 is clamped by the feed mechanism 130 in order to allow the user to subsequently tear or sever the material 116 by pulling the material against a tear blade or bar 158 mounted proximate to the dispensing slot 123. The clamping feature may be carried out by various devices. In the illustrated embodiment wherein the feed mechanism 130 includes a feed roller 136 and pressure roller 144, the feed roller 136 is stopped by a brake mechanism once the correct measured amount of towel material 116 has passed between the rollers. Various mechanical, electrical, or electromechanical brake devices can be utilized in this regard. A relatively simple brake is illustrated as a solenoid 150 that actuates a plunger, wherein the plunger then extends into one of a series of holes or recesses 140 defined in an end face 138 of the feed roller 136. The trigger signal is sent to the solenoid 50 upon the correct measured length of towel material 116 passing between the feed roller 136 and pressure roller 144. To release the brake, a release signal is sent to the solenoid 150 causing the plunger to retract and thus release the feed roller 136.

A brake trigger device 154 may be provided to trigger and engage the brake once the correct length of towel material 116 has passed between the rollers. In the illustrated embodiment, the trigger device 154 includes a revolution counter, such as a typical tacho-generator, that is configured with the feed roller 136 to measure the length of towel material 16 passing between the feed roller 136 and pressure roller 144 by counting the revolutions of the feed roller 136 or pressure roller 144. For example, the feed roller 136 includes a vane 142 configured at the end face 138 thereof. Revolutions of the vane 142 are detected and counted by the device 154, and a corresponding signal is forwarded to the control circuit 34. It should be appreciated that the term "control circuit" is used herein to broadly define any combination of relays, switches, power sources, counters, sensors, and the like that route the various signals and actuate the various components of the dispenser 126 as described herein. Once the revolution counter indicates that the required measured length of towel material 116 has passed the feed roller 136, the control circuit 134 triggers the brake to stop rotation of the feed roller 136. As explained, the signal is simply sent to the solenoid 150.

In an alternative embodiment, a mechanical braking and measuring system may be utilized. One such system widely known and used in the art is a gear system wherein the length of the sheet is determined by the arc of a curved rack that is geared to a metering roll. Such a system is used, for example in the LEV-R-MATIC® roll towel dispenser from Kimberly-Clark Corporation. This system utilizes a metering roll with a fixed ring gear on an end thereof that is geared to a curved rack gear by way of a floating pinion gear. The ring gear could be provided on the feed roll or pressure roll in the present dispenser. As the towel material is dispensed, the metering roll rotates and drives the curved rack gear by way of the pinion gear. The length of the sheet is determined by the degree of travel of the curved rack gear. At the stop position of the curved rack gear, the feed roll would be locked and the sheet material clamped thereby. The pinion gear is housed in an angled track and moves within the track to disengage from the ring gear and curved rack gear at the stop position of the rack gear, at which point the rack gear falls back to its start position. This type of system is well known by those skilled in the art and need not be described in great detail herein.

Still referring to FIG. 3, the tear blade or bar 158 is disposed within the housing 118 proximate to the dispensing slot 123 so that, once the towel material 116 is clamped, the user can sever the measured length of towel material into a sheet by pulling the towel forward against the tear bar 158.

After the sheet has been severed by the user (as sensed by the tear bar 158), the feed mechanism 130 automatically electrically dispense a measured length of the towel material 116 out of the dispensing slot 123 to define the tail 114 for the next subsequent user. To accomplish this, a motor trigger device is used to activate the motor once the sheet has been severed. Various devices may be used to sense that the sheet has been torn by the user. In the illustrated embodiment, the tear blade 158 "floats" on a carrier 160 to a certain degree so that the blade 158 is caused to move or deflect upon the user pulling the towel material 116 against the blade 158. A sensor 168 detects motion or deflection of the tear bar 158 and sends a corresponding signal to the control circuit 134. The sensor 168 may be a relatively simple contact arrangement between a stationary contact and the end of the tear blade 158.

In another embodiment not illustrated in the figures, the tear bar or blade 158 may be a cam actuated device that is recessed with in a slot defined in the feed roller 136. As the feed roller 136 rotates, cam followers move along cam surfaces and cause the blade 158 to pivot out of the slot in the feed roller to at least partially sever the towel material 116. For example, the towel material 116 may be severed up to about 95%. The user then simply gently pulls on the end of the sheet dispensed out of the slot 123 to completely separate the sheet. A mechanical or proximity sensor may be disposed to detect the pivoting action of the blade 158 and send a corresponding signal to the control circuit 134. This type of cam actuated cutter blade configuration is also known to those skilled in the art.

A power supply 172 is contained within the housing 118 to power the various electronic components and control circuit 134. The power source 172 may include a battery compartment for disposable DC batteries. Alternately, the dispenser 126 may be supplied with AC power and include and internal AC to DC adapter. This embodiment may be useful when the dispenser 126 can be mounted in close proximity to an AC outlet.

Switching of the operation mode of the dispenser 126 from the hanging tail mode described above to the hidden towel mode is controlled by the controller 134 in response to a signal transmitted to the controller 134 from the control system 45, as described above. In hidden towel mode, a forward-facing proximity detector 125, such as an infra-red (IR) detector, mounted on the dispenser 118 is powered on. The use of such sensors 125 to detect the presence of a user in close proximity to the dispenser and to initiate an automatic dispense cycle where a measured length of the towel material 116 is dispensed from the slot 123 is well-known in the art. In this mode, upon detection of, for example, the users hands, by the proximity detector 125, the control circuit 134 energizes the feed mechanism 130 to dispense a measured sheet of the material. In one embodiment, this sheet may be the same length as the tail 114 discussed above, wherein the user grasps and pulls the tail as discussed above. In an alternate embodiment, a longer, complete sheet of the material 116 is feed out of the slot 123, wherein the user simply pulls the sheet against the tear bar 158, as discussed above.

An additional proximity detector 127 is located adjacent and rearward of the dispensing slot 123 and is also powered on in the hidden sheet mode. This detector 127, which is also in communication with the control circuit 134, serves to detect whether the dispensed sheet has been removed. If the detector 127 detects that the sheet has not been removed by the user, the control circuit prevents a subsequent dispense cycle until the sheet has been removed. This feature prevents multiple dispense cycles by, for example, a user repeatedly waving their hands in front of the detector 125.

In the hidden towel mode, once the detector 127 detects that the sheet has been removed, the control circuit 134 resets for a subsequent dispense cycle.

It should also be appreciated that a dispenser 126 for use in the present method and system according to the invention may incorporate any combination of additional features found in conventional "hands-free" dispensers. For example, the dispenser may include an emergency manual feed device such as a manual hand wheel or knob. The dispenser may be configured to dispense a stub roll in addition to a primary roll. Any combination of such additional features is within the scope and spirit of the invention.

While the present invention has been described in connection with certain preferred embodiments it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed is:

1. A method for improving product refill of product dispensers in service areas, the product dispensers comprising electronic towel dispensers within the service area configured to switch operation between (1) a hanging-towel mode wherein a portion of a towel hangs from the electronic towel dispenser and is visible to a patron, and a subsequent towel portion is automatically dispensed and hangs from the electronic towel dispenser upon removal of the hanging towel by the patron, and (2) a hidden-towel mode wherein a towel to be dispensed is contained completely within the towel dispenser and is not dispensed until the patron is detected adjacent to the electronic towel dispenser, the method comprising:

monitoring a towel fill level in a plurality of electronic towel dispensers;
 upon one of the electronic towel dispensers reaching a setpoint low fill level, operating said electronic towel dispenser in the hidden-towel mode.

2. The method of claim 1, wherein the plurality of electronic towel dispensers are operated in hanging-towel mode until the setpoint low fill level is reached.

3. The method of claim 1, comprising switching at least one of the electronic towel dispensers operating in hidden-towel mode to hanging-towel mode.

4. The method of claim 1, comprising upon all of the plurality of electronic towel dispensers being operated in hidden-towel mode, switching at least one of the electronic towel dispensers to hanging-towel mode.

5. The method of claim 1, comprising a control system in communication with each of the plurality of electronic towel dispensers.

6. The method of claim 5, wherein the control system is configured to switch operations of the plurality of electronic towel dispensers from hanging-towel mode to hidden-towel mode or from hidden-towel mode to hanging-towel mode.

7. The method of claim 1, wherein each of the plurality of electronic towel dispensers comprises a proximity detector configured to detect whether a towel has been removed, the proximity detector in communication with a control circuit.

8. The method of claim 7, comprising upon the proximity detector detecting that the towel has not been removed, preventing a subsequent dispense cycle until the towel has been removed via the control circuit.

9. The method of claim 7, comprising upon the proximity detector detecting that the towel has been removed, initiating a subsequent dispense cycle via the control circuit.

10. The method of claim 1, wherein the setpoint low fill level comprises about 15% of a towel material remaining.

11. A system for improving product usage prior to refill of product dispensers in service areas, the service area having a plurality of product dispensers, the system specifically configured for practice of the method of claim 1.

\* \* \* \* \*